United States Patent [19]

Syrowik

[11] 4,127,301
[45] Nov. 28, 1978

[54] VEHICLE INTERIOR COVER PANEL MEANS

[75] Inventor: Daniel J. Syrowik, Sterling Heights, Mich.

[73] Assignee: Lon H. Romanski, Cadillac, Mich.

[21] Appl. No.: 716,464

[22] Filed: Aug. 23, 1976

[51] Int. Cl.² .............................................. B60R 5/04
[52] U.S. Cl. ............................... 296/37.16; 224/42.44
[58] Field of Search ................... 296/37.16, 24 R, 76, 296/100; 224/42.42 R, 42.42 A, 42.43, 42.44, 42.45 B, 42.46 B

[56] References Cited

U.S. PATENT DOCUMENTS

| 2,803,490 | 8/1957 | Ehret | 296/24 R |
| 3,069,199 | 12/1962 | Reardon | 296/24 R |
| 3,291,520 | 12/1966 | Smith | 296/24 R |
| 3,352,595 | 11/1967 | Bezlaj | 296/24 R |
| 3,393,936 | 7/1968 | Hall | 296/24 R |
| 3,891,263 | 6/1975 | Orsulak | 296/24 R |
| 3,909,060 | 9/1975 | Katayama | 296/37.16 |

Primary Examiner—Joseph F. Peters, Jr.
Assistant Examiner—John A. Carroll
Attorney, Agent, or Firm—Lon H. Romanski

[57] ABSTRACT

A security type panel is operatively connected as to be situated rearwardly of a vehicular seat back and to extend generally laterally thereby defining an effectively covered space behind such seat back and above a related cargo floor area.

10 Claims, 18 Drawing Figures

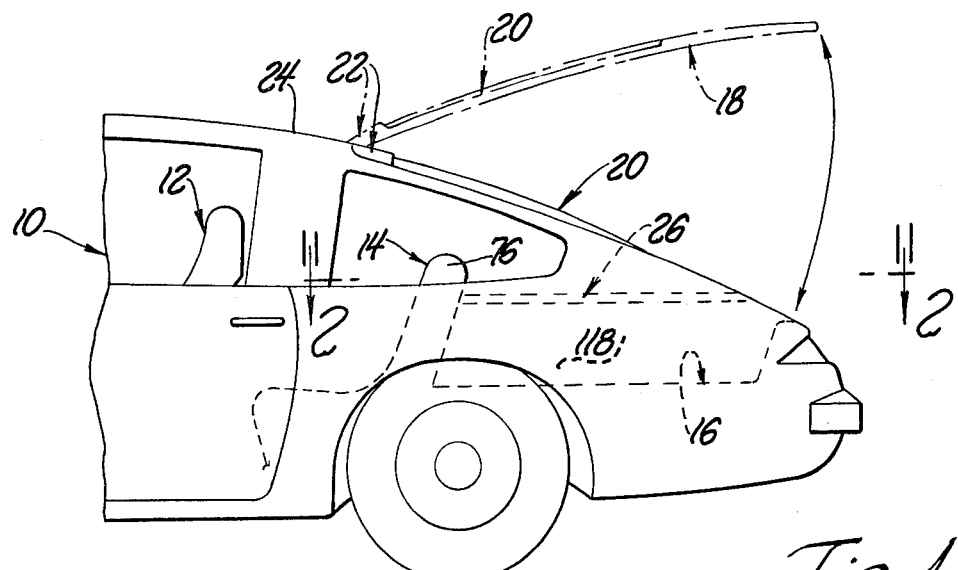
Fig. 1
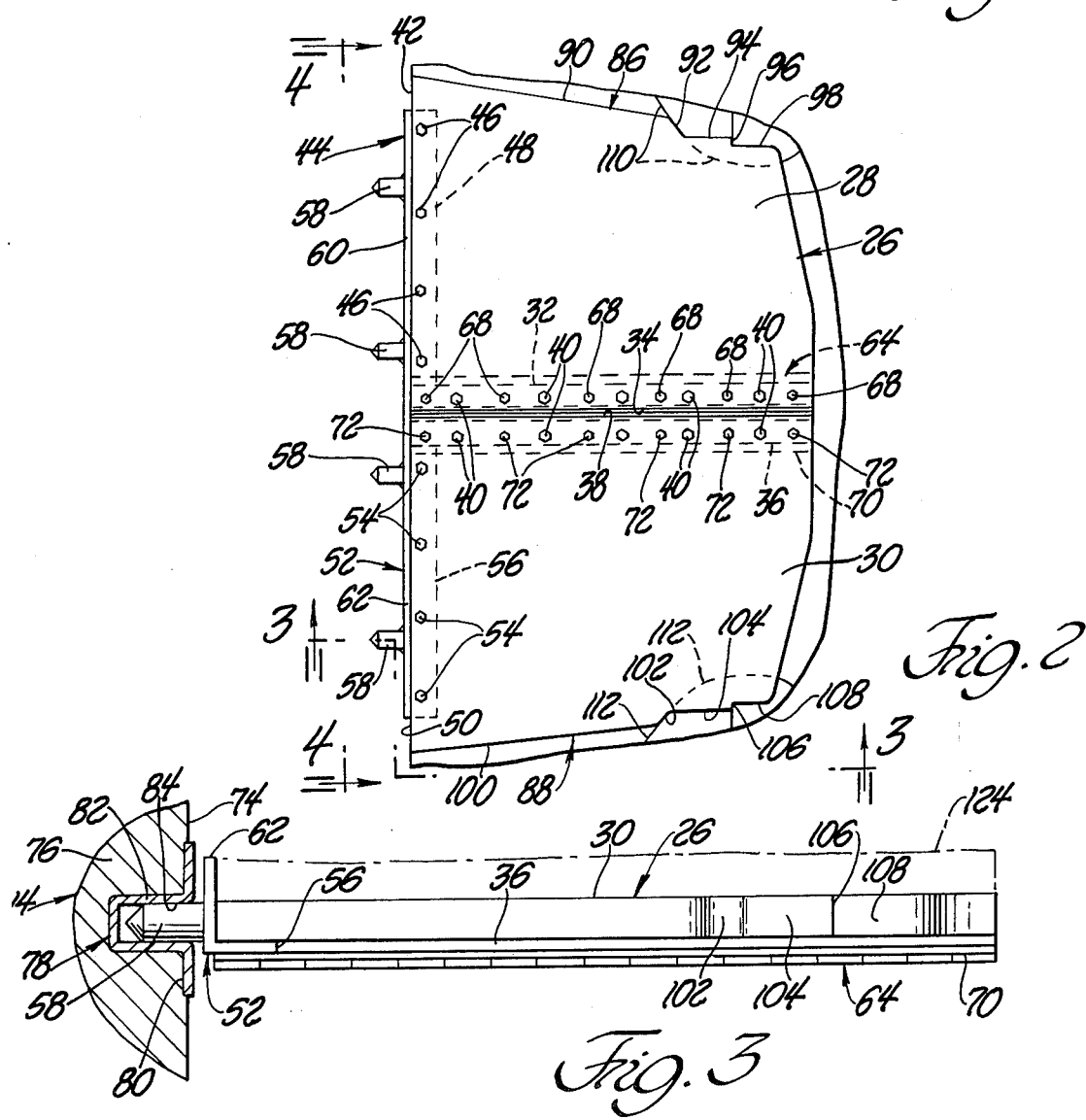
Fig. 2
Fig. 3

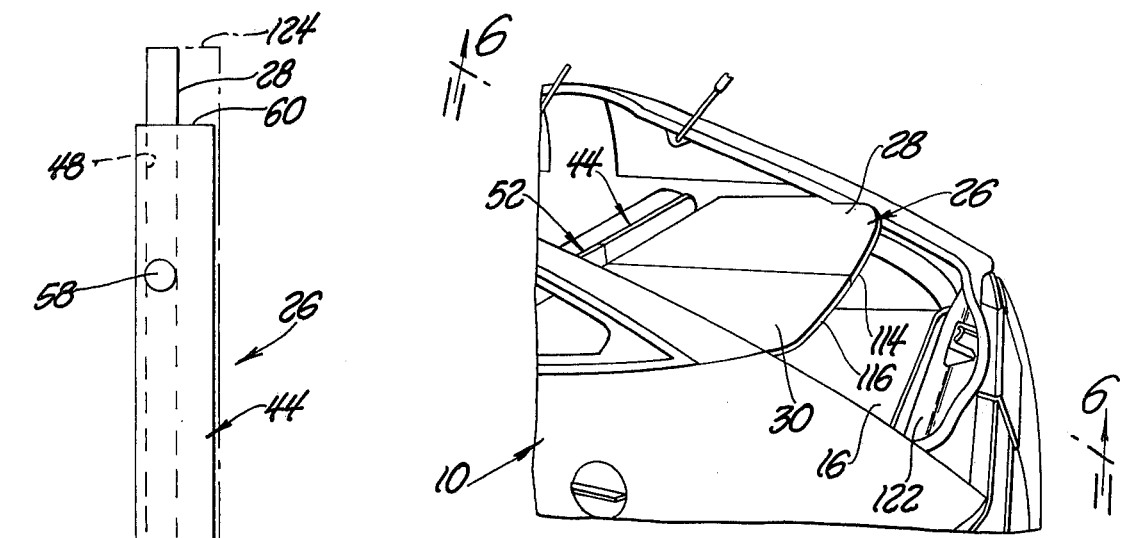
Fig. 5
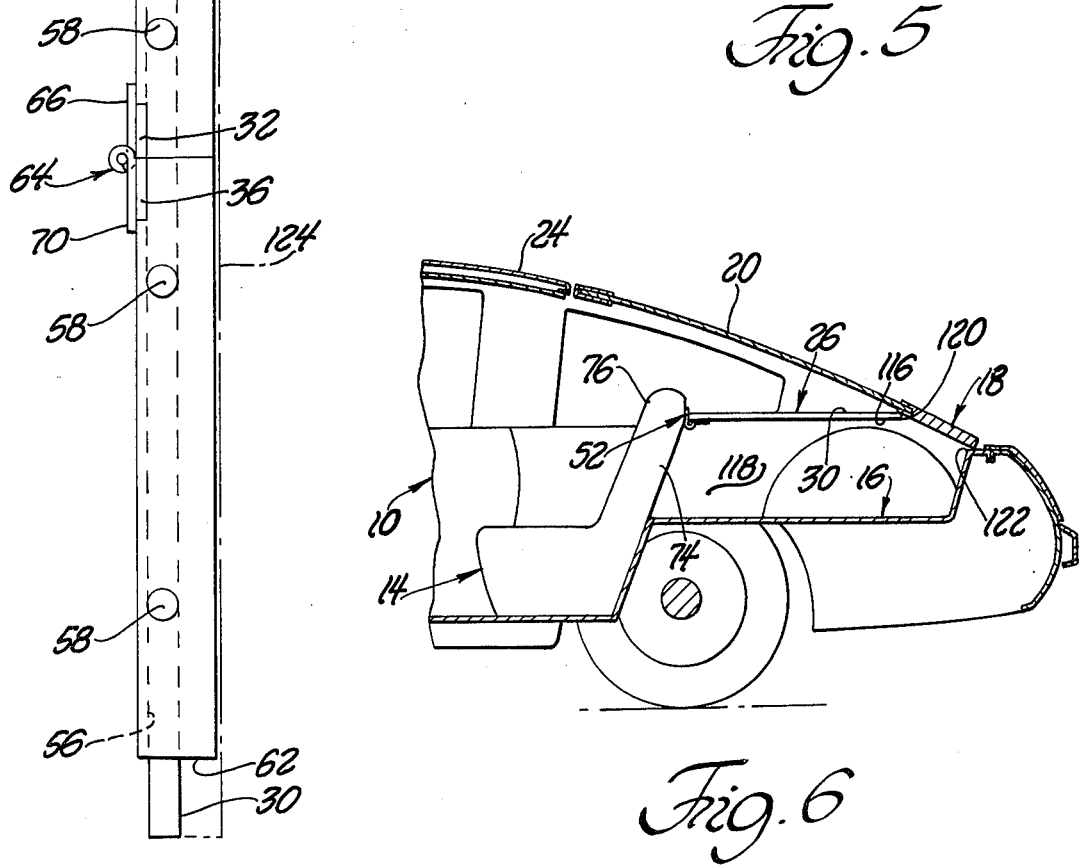
Fig. 4
Fig. 6

VEHICLE INTERIOR COVER PANEL MEANS

BACKGROUND OF THE INVENTION

In recent years the design of non-commercial type automotive vehicles has undergone a considerable change. That is, the trend has been, and is now, to have the vehicle relatively smaller in overall dimensions and yet provide for the greater use of such vehicles. For example, many of those who have in the past purchased what is usually referred to as a station wagon, have become aware of the fact that such a vehicle is usually quite large and relatively substantially heavier than automobiles which are not station wagons. It has also become apparent that the total available cargo carrying capacity of such station wagons is rarely, if ever, actually needed or used. Further, in most instances of normal driving and use, none of the cargo area provided by the station wagon is needed or used since the station wagon is employed for merely transporting the vehicle operator and possibly one or two other passengers.

The effect of the above is that the purchaser of a station wagon has had to pay considerably more to buy the station wagon and yet does not continually need the main advantage provided thereby, that being, large cargo carrying capacity. The purchaser thereof further continues to pay increased operating costs because of the relatively heavier weight of the station wagon resulting, for example, in greater fuel consumption, tire wear and brake wear.

Accordingly, a generally smaller and more personalized automobile has gained greater popularity with such having forwardly and rearwardly situated seat assemblies. Often, in such vehicles, there is an open cargo carrying area immediately rearwardly of the rear of the seat back portion of the rearwardly situated seat assembly. Some of such vehicles also provide for suitable hinging means whereby the rearwardly situated seat back may be pivotally swung generally forwardly and downwardly thereby placing the folded seat back in a plane generally extending the cargo support surface of the cargo carrying area.

Further, it has become popular in such vehicles to provide what is commonly referred to as a hatchback door. That is, such a door is usually one situated at the rear of the vehicle and pivotally swingable to and from open positions with the point or centerline of such swingable rotation being relatively high in the general roof structure of the vehicle. Such hatchback doors also contain a window therein with such window serving as the rear window of the vehicle when the hatchback door is closed. The provision of such a hatchback door, usually relatively large and often extending downwardly to the vicinity of the vehicular rear bumper, enables the easy loading and unloading of cargo through the rear of the vehicle.

A significant problem of such hatchback type vehicles is that whatever cargo is placed in the cargo area such is totally visible to anyone who looks through the vehicle windows. The fact that such cargo is visible adds to or creates the temptation for persons to break into the vehicle and steal such cargo. Such temptation is often given-in-to especially where the cargo is relatively costly as, for example, where the vehicle owner has possibly customized the vehicle by the addition of radio speakers or the like in the cargo carrying area. However, the provision of a permanent fixed security panel as a cover in such cargo carrying area would defeat the purpose of such generally open cargo area and significantly reduce its general utility especially where cargo of relatively large dimensions had to be transported.

Accordingly, the invention as herein disclosed and claimed is primarily directed to the solution of the preceding as well as other related and attendant problems.

SUMMARY OF THE INVENTION

According to the invention, a generally laterally and transversely extending panel is operatively detachably secured to the interior of an automobile as to be rearwardly disposed of the seat back portion of a passenger seat assembly as to thereby define a generally closed-in and covered cargo carrying area below the panel.

Various general and specific objects and advantages of the invention will become apparent when reference is made to the following detailed description of the invention considered in conjunction with the accompanying drawings.

BRIEF DESCRIPTION OF THE DRAWINGS

In the drawings, wherein for purposes of clarity certain details and/or elements may be omitted from one or more views:

FIG. 1 is a fragmentary side elevational view illustrating a vehicle employing the teachings of the invention;

FIG. 2 is a view taken generally on the plane of line 2—2 of FIG. 1 and looking in the direction of the arrows;

FIG. 3 is a view, in relatively enlarged scale, taken generally on the plane of line 3—3 of FIG. 2 and looking in the direction of the arrows;

FIG. 4 is a view, in relatively enlarged scale, taken generally on the plane of line 4—4 of FIG. 2 and looking in the direction of the arrows;

FIG. 5 is a fragmentary perspective view of the vehicle of FIG. 1 with the invention;

FIG. 6 is a cross-sectional view taken generally on the plane of line 6—6 of FIG. 5 and looking in the direction of the arrows;

DETAILED DESCRIPTION OF THE PREFERRED EMBODIMENTS

Figures 7, 8:
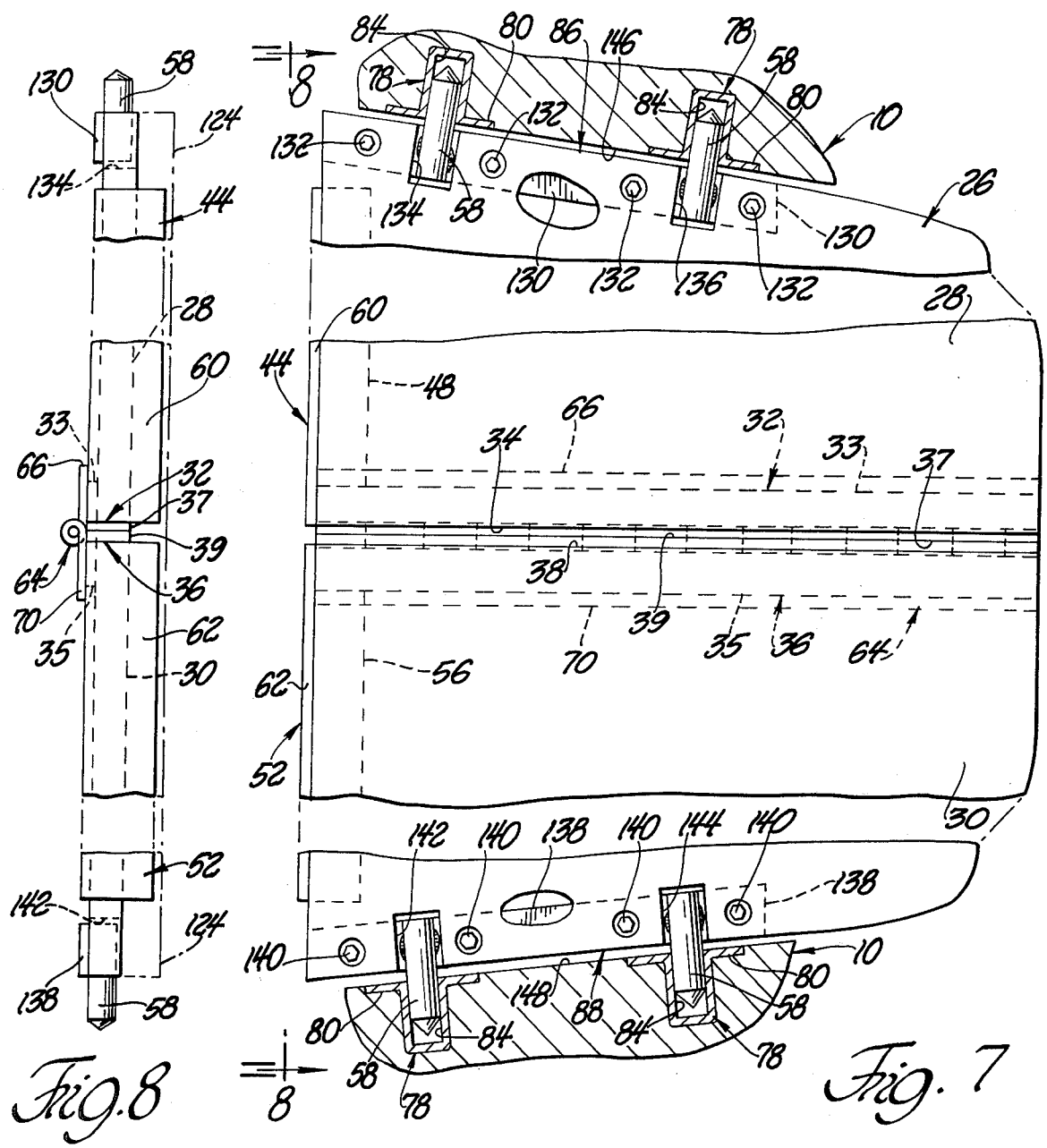
FIG. 7 is a view similar to that of FIG. 2 and illustrating a second embodiment of the invention.
FIG. 8 is a view taken generally on the plane of line 8—8 and looking in the direction of the arrows.

Referring now in greater detail to the drawings, FIG. 1 illustrates an automotive vehicle 10 having a passenger compartment in which are situated a forwardly or front passenger seat assembly 12 and a rearwardly or rear passenger seat assembly 14. Further, generally rearwardly of seat assembly 14, a cargo carrying floor-like area 16 is provided with access thereto being permitted as through a swingably openable hatchback door assembly 18 which, as illustrated, usually comprises a rear window 20. As is generally well known in the art, the hatchback type door is usually pivotally secured at its upper end 22 as to the roof structure 24 of the vehicle 10.

As generally depicted in FIG. 1 and more specifically illustrated in FIGS. 2, 3, 4, 5 and 6, cover or security panel means 26 is provided generally within the passenger compartment as to be located generally rearwardly of rear seat assembly 14 and spaced above cargo floor or surface 16.

As illustrated in FIGS. 2, 3 and 4, panel means 26 preferably comprises first and second panel members 28 and 30 which may be formed of plywood or any suitable relatively rigid material. A first metal reinforcing member 32 is situated on the underside of panel 28 as to, preferably, have a longitudinal edge thereof coplanar with an inner edge 34 of panel 28. A second reinforcing member 36 is similarly situated on the underside of panel 30 as to, preferably, have a longitudinal edge thereof coplanar with an inner edge 38 of panel 30. Edges 34 and 38 are pivotally swingable into general juxtaposition with each other. Such reinforcing members 32 and 36 may each be suitably secured to respective panels 28 and 30 as by suitable screws 40 which, as is well known in the art, may be countersunk in either or both the panels 28, 30 and reinforcing members 32, 36.

The forward edge 42 of panel 28 has an angle shaped metal reinforcing member 44 suitably secured thereto as by screws 46 operatively engaging lower disposed flange or leg 48 of member 44. Similarly, the forward edge 50 of panel 30 has an angle shaped metal reinforcing member 52 suitably secured thereto as by screws 54 operatively engaging lower disposed flange or leg 56 of member 52. A plurality of locating and supporting pins 58 are secured, as for example, by welding to the vertically extending flanges or legs 60 and 62 of respective angle reinforcing members 44 and 52.

Secured as to the underside of reinforcing members 32 and 36 is a longitudinally extending hinge means 64 having one hinge plate 66 secured, as by screws 68, to reinforcing member 32 and the other hinge plate 70 secured, as by screws 72, to reinforcing member 36.

As typically illustrated in FIG. 3, in the preferred arrangement, the rear 74 of the back rest portion 76 of seat assembly 14 carries a plurality of support aperture defining means, one of which is illustrated at 78, situated generally horizontally across seat back 74 as to respectively supportingly receive pins 58 therein. As generally depicted, each of the means 78 may comprise a flange portion 80 and a generally tubular extension 82 defining an internal passage 84 which slidably receives a support pin 58.

In the embodiment of FIGS. 2, 3 and 4, edge 86 of panel 28 and edge 88 of panel 30 have both been contoured as to partially accommodate various protrusions forming the interior contour of the vehicle 10. For example, edge 86 comprises a first generally laterally inclined segment 90 with a first stepped portion 92 leading to a surface 94, generally parallel to the axis of hinge means 64, which in turn meets with a second stepped surface 96 leading as to a surface 98 generally parallel to surface 94. Similarly, edge 88 comprises a first generally laterally inclined segment 100 with a first stepped portion 102 leading to a surface 104, generally parallel to the axis of hinge means 64, which in turn meets with a second stepped surface 106 leading as to a surface 108 generally parallel to surface 104. In the embodiment illustrated, the vehicle interior has contoured protrusions 110 and 112 which are, to the degree necessary, accommodated by stepped surfaces 92 and 102 as well as surfaces 94 and 104 as to enable a portion of such protrusions 110 and 112 to pass upwardly and yet permit undersurfaces 114 and 116 of panels 28 and 30 to rest generally on such protrusions 110 and 112 to thereby maintain the desired attitude relative to the vehicle and cargo area 16. That is, with the embodiment of FIGS. 1–6, all that needs to be done is to insert the support pins 58 into respective cooperating support means 78 and set the respective panels 28 and 30 down onto the vehicular protrusions 110 and 112 thereby resulting in the panel means 26 assuming a position generally depicted in any of FIGS. 1, 5 or 6. As is best depicted in FIGS. 5 and 6, once the panel or cover means 26 is situated within the vehicle it effectively defines a closed in cargo compartment 118 between itself and the cargo carrying surface 16. In the preferred arrangement, it will be noted, as illustrated in FIG. 6, that rearward end 120 of panel means 26 is at an elevation which is below the bottom edge of the window 20 when the hatchback door 18 is closed. However, when the door 18 is opened as in FIG. 5, an opening or clearance exists as between end 120 and vehicle body portion 122 permitting ready access to the cargo compartment. Obviously, no other support is absolutely required at the middle of the panel means 26 because of the placement of the hinge means 64 at the underside thereof as well as the cooperative abutting action as between the juxtaposed ends angle legs 60, 62 and/or the edges of reinforcing members 32, 36 and/or even the juxtaposed edges of panels 28 and 30. As generally depicted in phantom line in FIGS. 3 and 4, once the panel means 26 is installed, suitable carpeting or other decorative material 124 may be placed thereon to convey the desired aesthetic qualities. If the need should arise for a cargo area having an elevation greater than that defined between panel means 26 and cargo floor 16, all that needs to be done is to remove the panel 26 by withdrawing pins 58 from cooperating supports 78. Because of the hinge means 64, the panel means 28 may be folded, stored and carried within the vehicle while the relatively larger cargo compartment is being employed with no need to have to store the panel means 26 externally of the vehicle as within a garage, etc.

FIGS. 7 and 8 illustrate a modification of the invention shown in FIGS. 1–6. All elements in FIGS. 7 and 8 which are like or similar to those of any of the preceding FIGS. are identified with like reference numbers. In some of the ways that the embodiment of FIGS. 7 and 8 departs from that of the preceding FIGS. is, for example, by having the reinforcing members 32 and 36 of a cross-sectional angle configuration with member 32 having one leg or flange 33 thereof lying under panel 28 while its other flange or leg 37 is vertically upwardly directed as to be abutting edge 34 of panel 28. Similarly, reinforcing member 36 has one flange or leg 35 thereof lying under panel 30 while its other flange or leg 39 is vertically upwardly directed as to be abutting edge 38 of panel 30. Such members 32 and 36 as well as hinge means 64 may be operatively secured to the panels 28 and 30, they are situated as to extend generally laterally from the outer sides of such panels. That is, in the preferred arrangement of the structure of FIGS. 7 and 8, a first outer metal reinforcing member 130 is situated beneath and secured to the panel 28 along an edge thereof as by screws 132 which, as generally depicted, may be countersunk. The body portions of pins 58 may, in turn, be welded to reinforcing plate 130 with such portions of pins 58 being received within clearance apertures or cut-out portions 134 and 136 formed in panel 28. Similarly, a second outer metal reinforcing member 138 is situated beneath and secured to the panel 30 along an edge thereof as by screws 140 which, as generally depicted, may be countersunk. The body portions of the other pins 58 may, in turn, be welded to reinforcing plate 138 with such portions of pins 58 being received within clearance apertures or cut-out portions 142 and 144 formed in panel 30.

The support means 78 shown in the upper portion of FIG. 7 would be situated in or carried by a related portion 146 of the interior of vehicle 10, as on the right side thereof, while the support means 78 shown in the lower portion of FIG. 7 would be situated in or carried by a related portion 148 of the interior of vehicle 10, as on the left side thereof. As clearly indicated, when the panel means 26 is assembled to the associated vehicle, the outer surfaces of legs 37 and 39 of inner reinforcing members 32 and 36 abut against each other to thereby have panels 28 and 30 define a generally planar surface. The embodiment of FIGS. 7 and 8 would, of course, be positioned within the vehicle 10 as to define a cargo space as generally depicted at 118 of FIG. 6.

Figure 9:
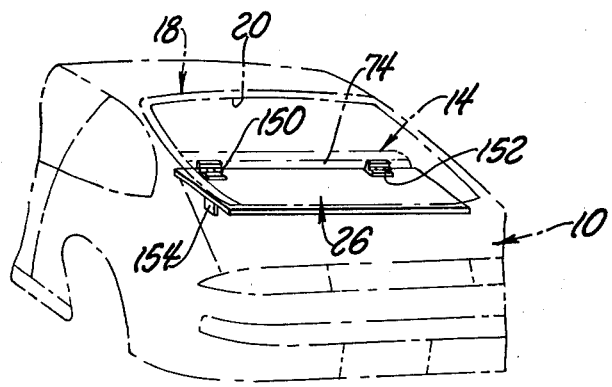
FIG. 9 is a perspective view of a third embodiment of the invention.
Figure 10:
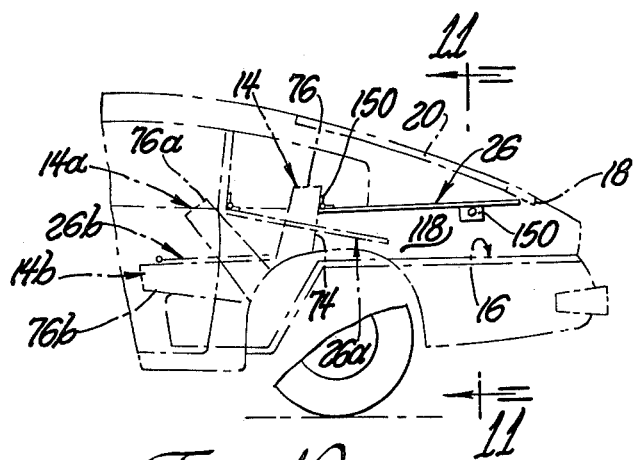
FIG. 10 is a side elevational view of the embodiment of FIG. 9.
Figure 11:
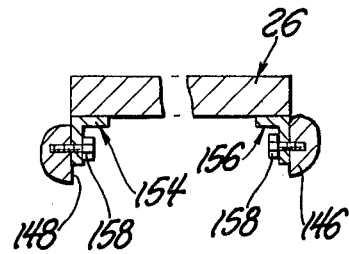
FIG. 11 is an enlarged fragmentary cross-sectional view taken generally on the plane of line 11—11 of FIG. 10 and looking in the direction of the arrows.

FIGS. 9, 10 and 11 illustrate, in somewhat simplified form, another embodiment of the invention. The elements in FIGS. 9, 10 and 11 which are like or similar to those of the preceding Figures are identified with like reference numbers. Referring now in greater detail, FIG. 9, illustrates panel means 26 having suitable hinge means 150, 152 operatively connected as to the surface 74 of the back rest portion 76 of the seat assembly 14. Vertical support for the remaining portion of panel means 26 may be provided as by support brackets 154 and 156 carried as by portions 148, 146 of vehicle 10 and suitably secured thereto as by screws 158.

As illustrated especially by FIG. 10, the invention also contemplates a situation wherein the rear seat assembly back rest 76 is pivotally secured at its lower end, as is well known in the art, enabling the back rest 76 to be pivotally swung from its upright position through intermediate positions, as at 76a, to its "down" or lowermost position at 76b at which the rear surface 74 functionally creates a forward extension of the cargo floor area 16.

It can be seen that in such an arrangement, wherein panel means 26 is operatively pivotally secured to the seat back rest 76, as the back rest 76 is pivotally rotated to its "down" position at 76b, panel means 26 slides off supports 154 and 156 and generally translates through intermediate positions, as at 26a, until finally assuming a position 26b when seat back rest 76 reaches its "down" position. As shown, panel means 26, when in its 26b position, is effectively flat against back rest rear surface 74 and cargo floor 16 thereby enabling the placement of cargo thereon. It should be apparent that even though hinge means 150 has been shown as being elevationally on top of panel means 26, such hinge means 150 may, nevertheless, be placed elevationally below the panel means 26.

Figure 12:
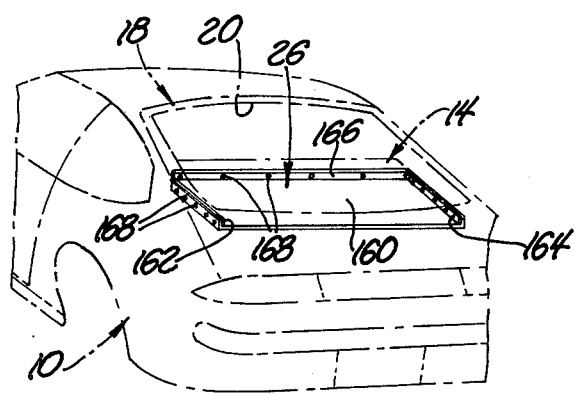
FIG. 12 is a view similar to FIG. 9 and illustrating a fourth embodiment of the invention.
Figure 13:
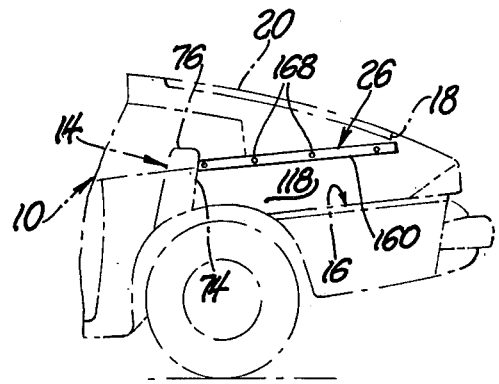
FIG. 13 is a side elevational view of the embodiment of FIG. 12.
Figure 14:
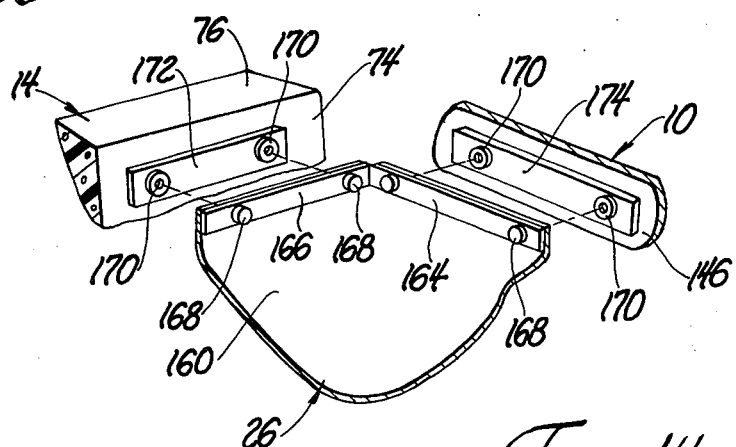
FIG. 14 is an enlarged fragmentary portion of the embodiment of FIGS. 12 and 13.

FIGS. 12, 13 and 14 illustrate, in somewhat simplified form, another embodiment of the invention. The elements in FIGS. 12, 13 and 14 which are like or similar to those of the preceding Figures are identified with like reference numbers. Referring now in greater detail, FIG. 12 illustrates panel means 26 as comprising a sheet 160 which, in turn, in the preferred arrangement, has its left and right side edge portions secured to and carried by reinforcing members 162 and 164. Similarly, the forward edge of sheet 160 is also secured to and carried by a reinforcing member 166. Each of the reinforcing members 162, 164 and 166 is shown as having a plurality of male type snap-like fastener portions 168 which coact with respective female type fastener portions 170. As generally illustrated, an appropriate number of fastener portions 170 may be secured to a carrier strip 172 which, in turn, is suitably secured as to the rear surface 74 of seat back rest 76, while an appropriate number of fastener portions 170 are also secured to carrier strips on both the left and right interior sides of the vehicle, as typically illustrated at 174, for coaction with male fastener portions 168. The reinforcing members 162, 164 and 166 may be secured to panel 160 in any suitable manner as, for example, by cementing; similarly, forward and side fastener carriers, as 172 and 174, may, for example, be adhesively secured to the interior of vehicle 10. In any event, respective coacting snap fastener portions 168 and 170 serve to support sheet-like panel member 160 to define the cargo carrying chamber or enclosure 118 as shown in FIG. 13. It is contemplated that even though panel means 160 may be comprised of any suitable material, panel means 160 may be made of relatively thin and relatively flexible material such as, for example, canvas. Further, it is also contemplated that the relatively flexible material, if such is employed for panel means 160, also be relatively elastomeric or yieldable as to enable the better peripheral conformity to the interior of the vehicle even when the interior has a greatly nonuniform or varying interior contour.

Figure 15:
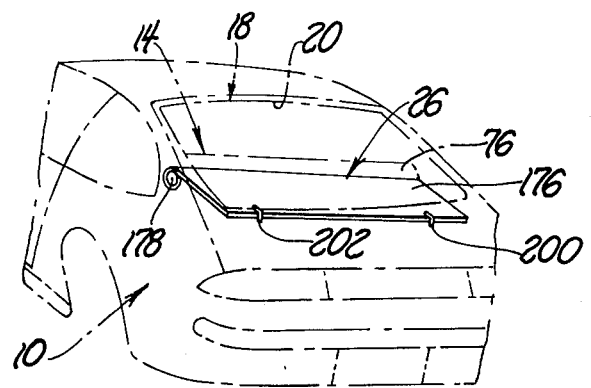
FIG. 15 is a view similar to FIG. 9 and illustrating a fifth embodiment of the invention.
Figure 16:
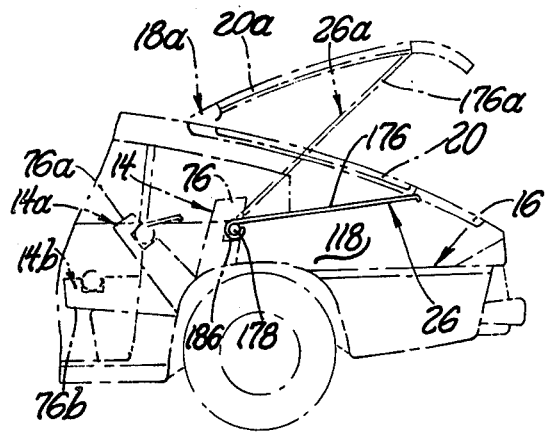
FIG. 16 is a side elevational view of the embodiment of FIG. 15.
Figure 17:
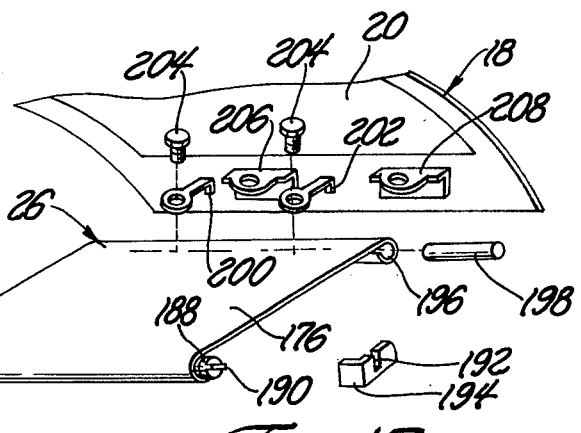
FIG. 17 is a perspective view, partly in exploded relationship, illustrating in greater detail some of the elements comprising the embodiment of FIGS. 15 and 16.

FIGS. 15, 16 and 17 illustrate, in somewhat simplified form, another embodiment of the invention. The elements in FIGS. 15, 16 and 17 which are like or similar to those of the preceding Figures are identified with like reference numbers. Referring now in greater detail, FIG. 15, 16 and 17 illustrate panel means 26 as comprising a flexible sheet-like member 176 having one end fixedly secured to a roller member 178 which has at one end thereof a cylindrical extension 180 which is rotatably received as within an aperture 182 of a cooperating support bracket 184 situated as within a recess 186 of the rear of seat back support 76 of seat assembly 14. The other end of roller 178 is provided as with a "window shade" type spring-loaded ratchet assembly 188 which has a relatively rotatable tong-like extension 190 receivable within a slot 192 of a second bracket 194 also situated as within recess 186.

The other end of panel member 176 may be formed in a loop-like configuration 196 as to receive therein a suitable stiffening or reinforcing member a portion of which is shown at 198. Hook members 200 and 202 may be respectively secured to panel end 196 and to member 198, as by screws 204, while cooperating latches or eye members 206 and 208 are preferably secured to the swingable end of vehicle hatchback door 18 at an elevation, when door 18 is closed, below that of the lower edge of hatchback window 20. Hooks 200 and 202 when respectively operatively engaged with eye or retainer members 206 and 208 serve to hold panel member 176 in a generally extended condition from roller 178 thereby defining the covered cargo space 118 of FIG. 16. Further, as also illustrated in FIG. 16, when the rear or hatchback door 18 is moved to its opened position 18a, the roller 178 permits, if necessary because of the relative geometry involved, panel member 176 to effectively extend in length to a condition as generally depicted at 26a and 176a of FIG. 16. As can be seen, this feature automatically causes the panel means 26 to be lifted thereby making ready access to the cargo area 118 even more easy whenever rear door 18 is opened. As with other embodiments and modifications of the invention, if the cargo to be carried requires a height greater than that which panel means 26 can accommodate when hook or fastener means 200 and 202 are secured to door 18, such fastener means 200 and 202 may be operatively disengaged as to enable panel member 176 to be wound onto roller 178. The embodiment of FIGS. 15, 16 and 17 has been described as having a spring-loaded "window shade" type ratchet; however, such, of course, is not absolutely necessary to the practice of the invention. For example, end 188 may be provided with only resilient means continually tending to cause panel member 176 to roll onto roller means 178. Obviously, this would place panel member 176 in a constant state of tension regardless of whether panel member 176 is in its closed position, depicted in solid line in FIG. 16, or in its open position as depicted at 176a, also in FIG. 16.

Figure 18:
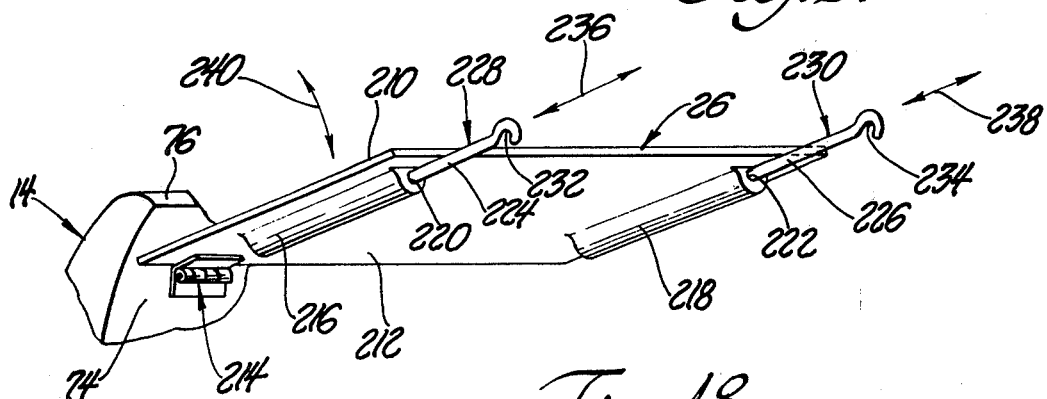
FIG. 18 is a perspective view illustrating still another embodiment of the invention.

FIG. 18 illustrates, in somewhat simplified and abreviated form, a further embodiment of the invention which, as will become apparent, may be a modification of the inventive concept of FIGS. 15, 16 and 17. The elements in FIG. 18 which are like or similar to those of the preceding Figures are identified with like reference numbers. Referring in greater detail to FIG. 18, and in conjunction therewith FIG. 17, the panel means 26 is illustrated as comprising a panel member 210 having its forward disposed end 212 suitably pivotally operatively connected, as by hinging means one of which is shown at 214, to the rear surface 74 of seat back support 76. Panel member 212 is provided with portions 216 and 218 which respectively define internal axially elongated passages 220 and 222 for the respective slidable reception therein of elongated shank portions 224 and 226 of axially slidable hook-like support members 228 and 230.

The panel means 26 of FIG. 18, although employable as by operatively securing hook portions 232 and 234 of members 228 and 230 to any related support means within the interior of the vehicle 10, it is contemplated that in the preferred arrangement hooks 234 and 232 would be operatively connectable, respectively, to cooperating support or latching means 206 and 208 carried by rear door 18 as generally depicted in FIG. 17. In such an arrangement it should be apparent that the hook members 228 and 230 move axially in directions generally indicated by arrows 236 and 238, to thereby increase and decrease the effective radius of rotation as panel 210 swings about pivot means 214, indicated by arcuate arrow 240, as rear door 18 is moved from and to a closed position.

Although only selected preferred embodiments and modifications of the invention have been disclosed and described, it is apparent that other embodiments and modifications of the invention are possible within the scope of the appended claims.

I claim:
1. The combination of
    A. an automotive vehicle having:
        (1) a passenger compartment,
        (2) at least one passenger seat assembly in said compartment and having a seat back-rest portion,
        (3) a cargo carrying surface rearwardly of said seat back-rest portion,
        (4) and access door means forming a generally rearward portion of said vehicle providing when opened a direct means of access to said cargo carrying surface from without said vehicle;
    B. cover panel means;
    C. said cover panel means being:
        (1) carried within said passenger compartment generally rearwardly of said seat back-rest portion,
        (2) generally laterally disposed and spaced upwardly above said cargo carrying surface defining a cargo carrying space above said cargo carrying surface and below said cover panel means, and
        (3) selectively removable from above said cargo carrying surface as to thereby permit the carrying on said cargo carrying surface of a cargo which is of a height greater than the elevational distance of said cargo carrying space otherwise defined between said cargo carrying surface and said cover panel means when said cover panel means is generally laterally disposed and spaced upwardly above said cargo carrying surface;
    D. said cover panel means comprising:
        (1) at least first and second panels in side-by-side relationship and each being generally horizontally disposed when spaced upwardly above said cargo carrying surface and defining said cargo carrying space, and
        (2) hinge means operatively interconnecting said first and second panels to each other with the hinging axis of said hinge means extending generally parallel to a medial line extending from the front of said vehicle to said rear of said vehicle; and
    E. fastener means for detachably securing said cover panel means to said vehicle and thereby elevationally supporting said cover panel means with respect to said cargo carrying surface, said fastener means comprising:
        (1) a plurality of pin-type fastener members, each of said plurality of pin-type fastener members having an axis which is generally contained in a generally horizontal plane when said first and second panels are detachably secured to said vehicle with each of said first and second panels being generally horizontally disposed and spaced upwardly above said cargo carrying surface defining said cargo carrying space,
        (2) a plurality of aperture-defining fastener members for the respective reception of respective ones of said plurality of pin-type fastener members, and

(3) wherein at least one of said fastener members is carried by said seat back-rest portion and wherein other of said fastener members are respectively carried by each of said first and second panels.

2. The combination according to claim 1 and further comprising window means carried by said access door means, and wherein said cover panel means when generally laterally disposed and spaced upwardly above said cargo carrying surface is at an elevation below a lower edge of said window means.

3. The combination according to claim 1 wherein said plurality of aperture-defining fastener members comprise said at least one of said members carried by said seat back-rest portion, and wherein said plurality of pin-type members comprise said other of said members carried by each of said first and second panels.

4. The combination according to claim 3 wherein said first and second panels respectively comprise first and second forward ends each of which is juxtaposed to said vehicle seat back-rest portion when said panel means is detachably secured to said vehicle seat back-rest portion, and further comprising first structural reinforcing means carried by said first panel generally along said first end, second structural reinforcing means carried by said second panel generally along said second end, and wherein said plurality of pin-type fastener members are fixedly secured to and carried by said first and second structural reinforcing means.

5. The combination according to claim 4 wherein said first and second structural reinforcing means when viewed in transverse cross-section, respectively comprise first and second generally laterally extending flange-like portions and first and second generally vertically extending flange-like portions, and wherein respective ones of said plurality of pin-type fastener members are fixedly secured to and carried by said first and second generally vertically extending flange-like portions.

6. The combination according to claim 4 wherein said first and second panels respectively comprise first and second elevationally relative upper generally planar surfaces and first and second elevationally relative lower generally planar surfaces, wherein said first and second structural reinforcing means when viewed in transverse cross-section respectively comprise first and second generally laterally extending flange-like portions and first and second generally vertically extending flange-like portions, and wherein said first and second generally vertically extending flange-like portions each define generally laterally extending edges which are elevationally situated at an elevation substantially above said first and second relative upper generally planar surfaces, said first and second generally vertically extending flange-like portions providing abutment surface means for associated covering material as may be carried atop said first and second relative upper generally planar surfaces.

7. The combination according to claim 6 wherein said first and second generally laterally extending flange-like portions are respectively fixedly secured to said first and second panels as to be respectively disposed generally beneath said first and second relative lower generally planar surfaces.

8. A foldable cover panel apparatus for use within the passenger compartment of an automotive vehicle, said apparatus comprising a first rigid panel member, a second rigid panel member, first and second inner edges respectively formed on said first and second panel members, hinge means operatively interconnecting said first and second panel members as to cause said first and second inner edges when said first and second panel members are in an unfolded condition to assume a juxtaposed condition with respect to each other, said first and second panel members further respectively comprising a first relatively forward edge situated generally transverse to said first inner edge and a second relatively forward edge situated generally transverse to said second inner edge, said first and second relatively forward edges cooperating when said first and second panel members are in an unfolded condition to define relatively forward cover panel edge means extending generally transverse to the longitudinal axis of said vehicle, reinforcing means carried by said first and second panel members generally along said first and second relatively forward edges, said reinforcing means comprising a first structural reinforcing member fixedly secured to said first panel member and a second structural reinforcing member fixedly secured to said second panel member, and support means carried by said first and second structural reinforcing members for operative connection to said vehicle for elevationally supporting said first and second panel members in an unfolded condition and in a generally horizontal position within said vehicle, said support means comprising a plurality of pin-like supports fixedly secured to said first and second structural reinforcing members as to extend therefrom, at least two of said plurality of pin-like supports being fixedly secured to one of said structural reinforcing members and at least one of said plurality of pin-like supports being fixedly secured to the other of said structural reinforcing members, said plurality of pin-like supports being so positioned on said first and second structural reinforcing members as to be generally horizontally disposed when said first and second panel members are in an unfolded condition and operatively connected through said pin-like supports to said vehicle.

9. A foldable cover panel apparatus according to claim 8 wherein said first and second structural reinforcing members respectively comprise first and second elongated members each having an L-shaped transverse cross-sectional configuration, wherein in each of said elongated members one leg of said L-shaped configuration is secured to the respective associated panel member, and wherein in each of said elongated members the other leg of said L-shaped configuration carries said pin-like supports.

10. A cover panel apparatus according to claim 9 wherein said other leg of each of said first and second reinforcing members extends to an elevation above the said first and second panel members.

* * * * *

UNITED STATES PATENT AND TRADEMARK OFFICE
CERTIFICATE OF CORRECTION

PATENT NO. : 4,127,301

DATED : November 28, 1978

INVENTOR(S) : Daniel J. Syrowik

It is certified that error appears in the above-identified patent and that said Letters Patent are hereby corrected as shown below:

On the cover page thereof at item "73", after "Assignee:" delete "Lon H. Romanski, Cadillac, Mich.".

Signed and Sealed this

Twenty-sixth Day of February 1980

[SEAL]

Attest:

SIDNEY A. DIAMOND

Attesting Officer

Commissioner of Patents and Trademarks